(12) United States Patent
Negishi

(10) Patent No.: US 8,447,561 B2
(45) Date of Patent: May 21, 2013

(54) SHAPE MEASUREMENT METHOD OF SYNTHETICALLY COMBINING PARTIAL MEASUREMENTS

(75) Inventor: Mahito Negishi, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 12/476,970

(22) Filed: Jun. 2, 2009

(65) Prior Publication Data

US 2009/0306931 A1  Dec. 10, 2009

(30) Foreign Application Priority Data

Jun. 6, 2008 (JP) ................................ 2008-149366

(51) Int. Cl.
*G01B 11/08* (2006.01)

(52) U.S. Cl.
USPC .......................................... 702/167; 702/168

(58) Field of Classification Search
USPC ................................................ 702/167, 168
See application file for complete search history.

(56) References Cited

U.S. PATENT DOCUMENTS

| | | | | |
|---|---|---|---|---|
| 4,901,253 A * | 2/1990 | Iwano et al. | .................. | 345/419 |
| 5,343,410 A * | 8/1994 | Tsujiuchi et al. | ............. | 382/284 |
| 5,579,246 A * | 11/1996 | Ebersbach et al. | .............. | 702/95 |
| 6,412,329 B1 * | 7/2002 | Nai | ................................ | 73/1.79 |
| 6,611,791 B1 * | 8/2003 | Kase et al. | .................... | 702/167 |
| 6,671,650 B2 * | 12/2003 | Ogura et al. | .................. | 702/152 |
| 6,956,657 B2 | 10/2005 | Golini et al. | .................. | 356/512 |
| 7,286,949 B2 * | 10/2007 | McFarland et al. | ............. | 702/95 |
| 7,591,171 B2 | 9/2009 | Negishi | ............................ | 73/105 |
| 2002/0183964 A1 * | 12/2002 | Handa et al. | .................. | 702/167 |
| 2005/0160211 A1 * | 7/2005 | Kadowaki et al. | ............ | 710/300 |
| 2006/0285122 A1 * | 12/2006 | Bankhead et al. | ............. | 356/511 |

FOREIGN PATENT DOCUMENTS

| | | |
|---|---|---|
| JP | 3182056 | 4/2001 |
| JP | 3272952 | 1/2002 |

OTHER PUBLICATIONS

Samuel et al., Evaluation of Circularity and Sphericity from Coordinate Measurement Data, Journal of Materials Processing Technology 139 (2003) 90-95.*

* cited by examiner

*Primary Examiner* — Jonathan C Teixeira Moffat
*Assistant Examiner* — Timothy H Hwang
(74) *Attorney, Agent, or Firm* — Fitzpatrick, Cella, Harper & Scinto

(57) ABSTRACT

Coordinate transformation parameters are adopted at the time of synthetically combining partial measurement data so as to eliminate the setting error that can get in when a workpiece is set in position on a measuring machine. Then, a shape parameter is adopted to estimate the approximate error shape of the entire workpiece and the approximate error shape is removed from the measurement data. As a result, the residuals are reduced if the measurement data are those of three-dimensional sequences of points. Differences are small when small residuals are compared so that the mismatch is reduced. According to the present invention, the entire measurement data can be synthetically combined without using the conventional concept of overlap.

4 Claims, 12 Drawing Sheets

FIG. 11A    FIG. 11B    FIG. 11C
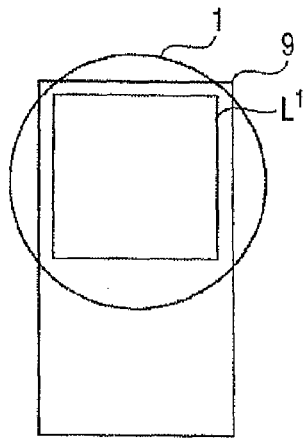 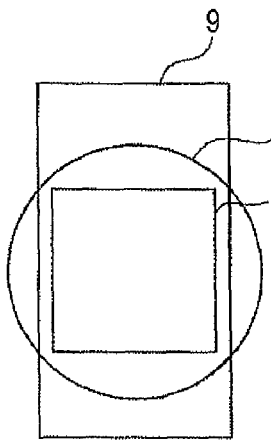 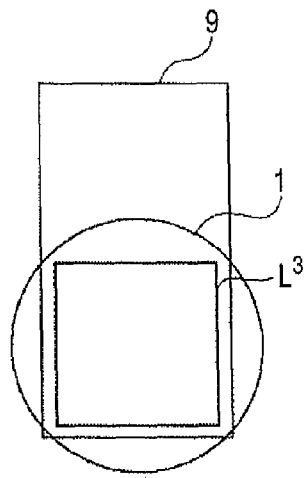
FIG. 12
PRIOR ART
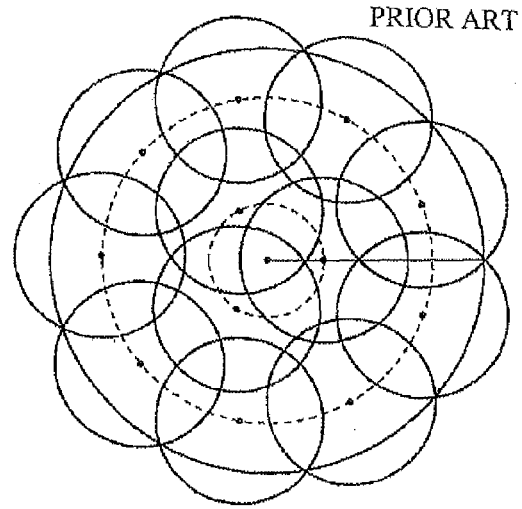

SHAPE MEASUREMENT METHOD OF SYNTHETICALLY COMBINING PARTIAL MEASUREMENTS

BACKGROUND OF THE INVENTION

1. Field of the Invention

This invention relates a measurement technique of synthetically combining plural sets of partial measurement data obtained by means of a contact type probe and computationally determining the overall measurement data. This technique finds applications in the field of measuring a large optical element by an instrument having only a small measurable region.

2. Description of the Related Art

Partial measurement represents a technique that has been developed through shape measurement mainly using interferometers. In this specification, "a partial measurement technique" is a synonymous expression of "a stitching technique", which is an expression that has conventionally been used. Additionally, in this specification, the expression of "the difference of the measurement data in an overlap region" means "a mismatch" that has conventionally been employed.

The partial measurement technique of this invention can be applied to and developed for coordinate measuring machines. Therefore, the difference between shape measurement by an interferometer (interferometry) and shape measurement by a coordinate measuring machine will be described first.

Interferometry is an optical measurement method of observing the interference fringe produced by a measurement wavefront that reflects the shape of a workpiece and a reference wavefront that is formed artificially by means of a camera and determining the shape from the observed interference fringe.

Generally, plural sets of measurement data show the differences from the same reference wavefront. In other words, measurement data indicates the deviations from a common offset that is the reference wavefront. Additionally, the deviations are required to be small enough to allow the interference fringe to be observed. Thus, when a measurement region is divided into a plurality of regions that overlap each other for measurement, the difference of the measurement data in an overlap region is small.

When, for example, visible light is employed, the gaps of interference fringe are of the order of sub-microns, or the differences among measurement data are of the order of microns at largest. A workpiece that requires partial measurements, or stitchings, may be a lens having a diameter of e.g. about 1 m. When compared with this size, the difference of the measurement data is very small. In short, interferometry is characterized in that the difference of partial measurement data, or the mismatch, is small in principle.

On the other hand, the measurement data of a coordinate measuring machine are a set of three-dimensional positions of points on the surface of a workpiece. In the case of a coordinate measuring machine using a contact type probe, the front end of the probe is brought into contact with the surface of the workpiece to determine the three-dimensional position of the front end of the probe. Then, the contact type probe is driven to scan the surface of the workpiece and continuously obtain data on three-dimensional positions in order to determine the profile of the surface of the workpiece.

In the measuring operation, the differences among the plurality of measurement data of the overlap regions are influenced by the position/attitude error of the machine and the fitting error of the workpiece. Generally, it is difficult to reduce the errors having six degrees of freedom because a very high degree of accuracy of installation is required.

Then, as a result, in the case of a lens having a diameter of 1 m as cited above, the differences among measurement data in the overlap regions may well exceed 1 mm. Additionally, the values of the measurement data are large if compared with those of the measurement data of interference measurement since there is not any common shape that can be subtracted from the measurement data unlike the instance of the use of a reference wavefront for interference measurement. In short, when a coordinate measuring machine is used, the differences of partial measurement data, or the mismatches, are characterized by their remarkable magnitude if compared with interference measurement.

The stitching technique of joining partial measurement data together to synthesize the entire shape is centered at the computation method of connecting measurement data. This method can be simplified to a two-step method as described below.

Step 1: Transforming plural sets of partial measurement data, using parameters

Step 2: Laying the transformed data and synthetically combining them to obtain overall measurement data The plurality of partial measurement data can be made to overlap one on the other and synthetically combined by interpolating and averaging them in Step 2. However, since transformation methods that can be used for Step 1 are innumerable, the quality of the stitching technique depends on how an optimum transformation method is selected. Generally, parameters to be used for describing the transformation method and an evaluation function are defined and the parameters are adjusted to make the evaluation function optimum.

Currently, no optimum answer has been found yet for the technique of synthetically combining partial measurement data and hence various methods have been proposed. The differences of the proposed methods can be made clear by classifying them, paying attention to the following two points.

1 How an evaluation function and parameters are defined?
2 How the optimization problem is solved?

FIG. 12 of the accompanying drawings schematically illustrates the known technique disclosed in U.S. Pat. No. 6,956, 657. This patent document proposes an evaluation function which represents "the inconsistency of data from respective data maps in the overlap regions and is expressed by linearly combining parameters"; hence the mismatch expressed by a linear combination of parameters being employed as evaluation function. Additionally, the above-cited Patent Document proposes a method of minimizing the evaluation function by making all the parameters vary simultaneously as a method of optimizing the evaluation function.

(a) and (b) of FIG. 13 of the accompanying drawings schematically illustrate another known technique disclosed in Japanese Patent No. 3182056. With the method of this patent document, a mark is arranged on a workpiece. Additionally, the patent document proposes a mismatch as an evaluation function. The above patent document also proposes a method of firstly aligning the mark and subsequently minimizing the mismatch as a method of optimizing the evaluation function.

On the other hand, a coordinate measuring machine disclosed in Japanese Patent No. 3272952 Publication is known. It is a machine designed to drive a contact type probe p to scan the surface of a workpiece w such as an optical element or a metal mold, applying it thereto, in order to determine the current three-dimensional coordinate position of the probe.

SUMMARY OF THE INVENTION

Before describing the technical problems solved by the present invention, the notation of this specification will be described below. A partial measurement data is represented by A. A numeral is affixed to the right shoulder of A in order to discriminate plural sets of partial measurement data. In other words, the numeral at the right shoulder of A represents a measurement number. For example, $A^1$ and $A^2$ respectively represent two partial measurement data. Each partial measurement data is a set of measurement points. When the elements constituting a partial measurement data need to be discriminated from each other, a numeral is suffixed to A. Thus, the suffixed numeral represents the number of a measurement point. For example, the m-th measurement point of data $A^1$ is expressed as $A^1_m$.

Conventionally, a plurality of partial measurements are conducted in overlap regions as illustrated in FIG. 12 and the parameters are optimized so as to minimize the difference of the measurement data of each overlap region, or the mismatch.

However, the above-described known stitching technique is developed on the basis of interference measurements and new problems as listed below arise when it is extended to measurements using coordinate measuring machines. In other words, new problems as listed below arise when measurement data show differences of magnitudes that are remarkable if compared with ever.

(1) The accuracy level is low because overlap regions cannot be determined highly accurately.

This will be described by referring to (a) to (c) of FIG. 2 of the accompanying drawings. In (a) to (c) of FIG. 2, the top part (a) illustrates partial measurement data of a workpiece. The error, if any, of the measuring machine will not be taken into consideration for the purpose of simplicity of explanation. Assume that two cross sectional data are connected to each other in the following description.

$A^1$ and $A^2$ are two partial measurement data. These data are for the shapes obtained by observing a workpiece, changing the position/attitude of observation. The change in the position/attitude is referred to as setting error, which setting error arises when the workpiece is set in position in the machine. Coordinate transformations $T^1$ and $T^2$ are employed to correct the setting error. Six degrees of freedom (translations of X, Y and Z and rotations around X, Y and Z axes) are generally conceivable for coordinate transformations. The outcome of the coordinate transformations is illustrated in the middle part (b) of FIG. 2. Note that the shape obtained by coordinate transformations of partial measurement data $A^n$ is expressed as $B^n = T^n(A^n)$, where n is the number of measurement. In (a) to (c) of FIG. 2, reference numeral 2 denotes the overlap region.

Conventionally, the coordinate transformations $T^1$ and $T^2$ are optimized so as to reduce the difference between $B^1$ and $B^2$ in the overlap region 2, or the mismatch. Note that $B^1$ and $B^2$ are vertically displaced from each other in (a) to (c) of FIG. 2 for the purpose of description.

However, there are more than one sites that can reduce the mismatch in the overlap region. As illustrated by part (c) of FIG. 2, the mismatch can be reduced at various sites by changing the size of the overlap region 2. Then, different shapes are produced by joining $B^1$ and $B^2$ together as clearly seen by comparing part (b) and part (c) of FIG. 2. In short, the above-described conventional art cannot optimally determine an overlap region and hence it results in a low measurement accuracy level if it is applied to a coordinate measuring machine.

Generally, when the workpiece has a non-spherical shape, the site where two partial shapes fit together should uniquely be determined. However, in a narrow region where measurement regions overlap each other, the non-spherical nature will be small regardless what the non-spherical shape may be. In other words, it can be approximated by a spherical surface so that a large error will arise when determining the overlap region. The net result will be a low measurement accuracy level.

This is a minor problem in the case of interferometers but it is very significant and shows a new aspect in the case of coordinate measuring machines for the reasons that will be described below.

Interferometers involve only a small mismatch by nature and hence the quantity of shift of the measurement data by coordinate transformation $T^n$ is also small. Therefore, the overlap region changes to a small extent to exert a minor influence on the overall shape, slightly deteriorating a measurement accuracy.

However, the coordinate measuring machines involve a remarkably large mismatch and hence the quantity of shift of the measurement data by coordinate transformation $T^n$ is also large. Therefore, the overlap region changes to a large extent to exert a great influence on the overall shape.

Now, let us get back to the instance of observing the shape of a lens having a diameter of about 1 m. The mismatch will be of the order of micron in the case of an interferometer, whereas the positional displacement may well be not less than 1 mm when a workpiece is set in position in a coordinate measuring machine and hence the mismatch will be of a corresponding order i.e., the order of millimeters. In other words, the magnitude of the mismatch will be remarkably large as pointed out above. There will be a difference of digits in terms of magnitude between the mismatch of an interferometer in which each partial measurement data shows only a small mismatch because the obtained measurement data are two-dimensional data and the mismatch of a coordinate measuring machine in which each partial measurement data shows a large mismatch because the obtained measurement data are three-dimensional data.

Therefore, overlap regions cannot be determined highly accurately for partial measurements by a coordinate measuring machine to consequently show a poor measurement accuracy level. This problem is not dissolved if the workpiece shows a non-spherical surface.

(2) Partial shapes may fit together at a wrong site to increase the measurement error.

This will be described below by referring to (a) and (b) of FIG. 4 of the accompanying drawings. Various shape errors can arise in the process of manufacturing an optical element. There are occasions where a periodical shape error referred to as ripple or intermediate periodical error takes place because of vibrations of a glass-grinding apparatus. Normally, it is a small error with a period of several millimeters and an amplitude of sub-microns. In (a) and (b) of FIG. 4, it is emphatically illustrated for the purpose of easy understanding.

The conventional art using an interferometer joins two partial measurement data together in an overlap region so as to make them agree with each other at the joint. However, as illustrated in part (a) and part (b) of FIG. 4, wrong waves may fit together because of the periodicity of ripple.

Particularly, in the case of three-dimensional data, right waves may not necessarily fit together because there are many sites where waves can fit together. The overall shape will be damaged severely when wrong waves fit together at a wrong site as clearly seen from (a) and (b) of FIG. 4.

In other words, with the conventional art, two partial measurement data can fit together at a wrong site in an overlap region to aggravate the measurement error. Therefore, the conventional art cannot find measurement applications that require reliability.

(3) A slight change in the overlap region significantly affects the overall shape to aggravate the accuracy level.

As described above by referring to (a) to (c) of FIG. 2, the overall shape will change remarkably when the area of the overlap region is changed only slightly as clearly seen from part (b) and part (c) in FIG. 2.

While this problem is a minor problem to interferometers, it is a very significant new problem for coordinate measuring machines for the reason that is described below.

The partial measurement data of an interferometer show the differences from the same reference wavefront as described earlier. Therefore, the error of the overall shape is obtained by adding the connection error of the partial measurement data to the reference wavefront. The partial measurement data of a magnitude of the order of microns are small relative to the three-dimensional size that the reference wavefront shows, the surface of a 1 m lens for instance. Therefore, if there is a connection error, its influence is limited.

On the other hand, no such a common reference wavefront exists in the case of a coordinate measuring machine and hence the connection error of the partial measurement data becomes the error of the overall shape. The connection error of partial measurement data that include position/attitude errors of the order of millimeters will seriously aggravate the accuracy level.

(4) It takes time because it is necessary to accurately search overlap regions.

A technique for accurately locating an overlap region has been studied as illustrated in (a) and (b) of FIG. 13 and disclosed in Japanese Patent No. 3182056.

According to the technique, a mark is put onto a workpiece as illustrated in (a) to (c) of FIG. 3 or a characteristic shape is utilized as mark if such a mark is found in the measurement data. In (a) to (c) of FIG. 3, part (a) illustrates a partial measurement data of a workpiece. Assume that a marking shape 3 is put onto the workpiece as a position indicating mark. It may be a projection as illustrated in (a) to (c) of FIG. 3.

In (a) to (c) of FIG. 3, part (b) illustrates the outcome of determining the overlap region of partial measurement data $A^1$ and $A^2$ by means of the marking shape 3 and optimizing the coordinate transformations $T^1$ and $T^2$ so as to minimize the mismatch. Note that $B^1$ and $B^2$ are vertically displaced from each other in (a) to (c) of FIG. 3 for the purpose of description.

However, it takes time to search out the right site where the partial measurement data agree with each other by means of this technique because it is necessary to look into all the area where they may overlap and find out the most suitable site as right site.

When compared with an interferometer, a coordinate measuring machine involves a large mismatch and hence the required quantity of move is large for coordinate transformation. Therefore, the area to be looked into becomes large and hence the problem becomes more serious. Thus, while this problem is a small problem for interferometers, it is a very significant new problem for coordinate measuring machines.

Furthermore, this technique is inconvenient because it can be applied only when a mark can be put onto a workpiece. No mark should be put onto a high precision optical element.

As pointed out above, it takes time when the conventional art is applied to a coordinate measuring machine because it is necessary to accurately search for the right overlap region. Additionally, the conventional art may not be applied in many cases because mark should be put onto the workpiece.

The present invention is made in view of the unsolved problems that are caused by the fact that partial measurements using a coordinate measuring machine intrinsically involve a large mismatch unlike interferometry.

To solve the above-described problems, the present invention provides a shape measurement method of synthetically combining plural sets of partial measurement data of a workpiece, the method including: a step of collecting partial measurement data respectively from a plurality of partial regions of the workpiece; a step of respectively transforming coordinates of the plurality of partial measurement data, using coordinate transformation parameters; a step of defining a reference shape including an approximate shape error common to the plurality of partial measurement data, using a shape parameter; a step of defining parameters of computing the difference between the plurality of coordinate-transformed partial measurement data and the reference shape as differential shape and defining both the coordinate transform parameters and the shape parameter so as to make the evaluation value defined from the differential shape approach a predetermined value; and a step of connecting the partial measurement data, using both the coordinate transformation parameters and the shape parameter defined by using the evaluation value.

Thus, according to the present invention of this application, the positional displacements of the partial measurement data can be accurately determined without using the concept of overlap region so that the problems (1) through (4) that are attributable to the use of one or more than one overlap regions.

In addition to the above advantage, the present invention provides an advantage that the overall shape can be synthesized efficiently by a simple method.

Further, the present invention can correct the systematic error of a measuring machine by adding the systematic error to parameters, enabling to improve the measurement accuracy.

The present invention also provides an effect of preventing the instability of computations that arise depending on the shape of the workpiece.

The present invention also enables to stably computationally determine the shape of the workpiece if it includes one or more than one shape errors having a high spatial frequency.

The method of the present invention can be used not only for coordinate measuring machines but also for connection of plural sets of partial measurement data obtained by interference measurements.

Further features of the present invention will become apparent from the following description of exemplary embodiments with reference to the attached drawings.

BRIEF DESCRIPTION OF THE DRAWINGS

FIGS. 11A, 11B and 11C are schematic illustrations of Example 3 of the present invention.

FIG. 12 is a schematic illustration of the first conventional art.

DESCRIPTION OF THE EMBODIMENTS

First Embodiment

Figure 1:
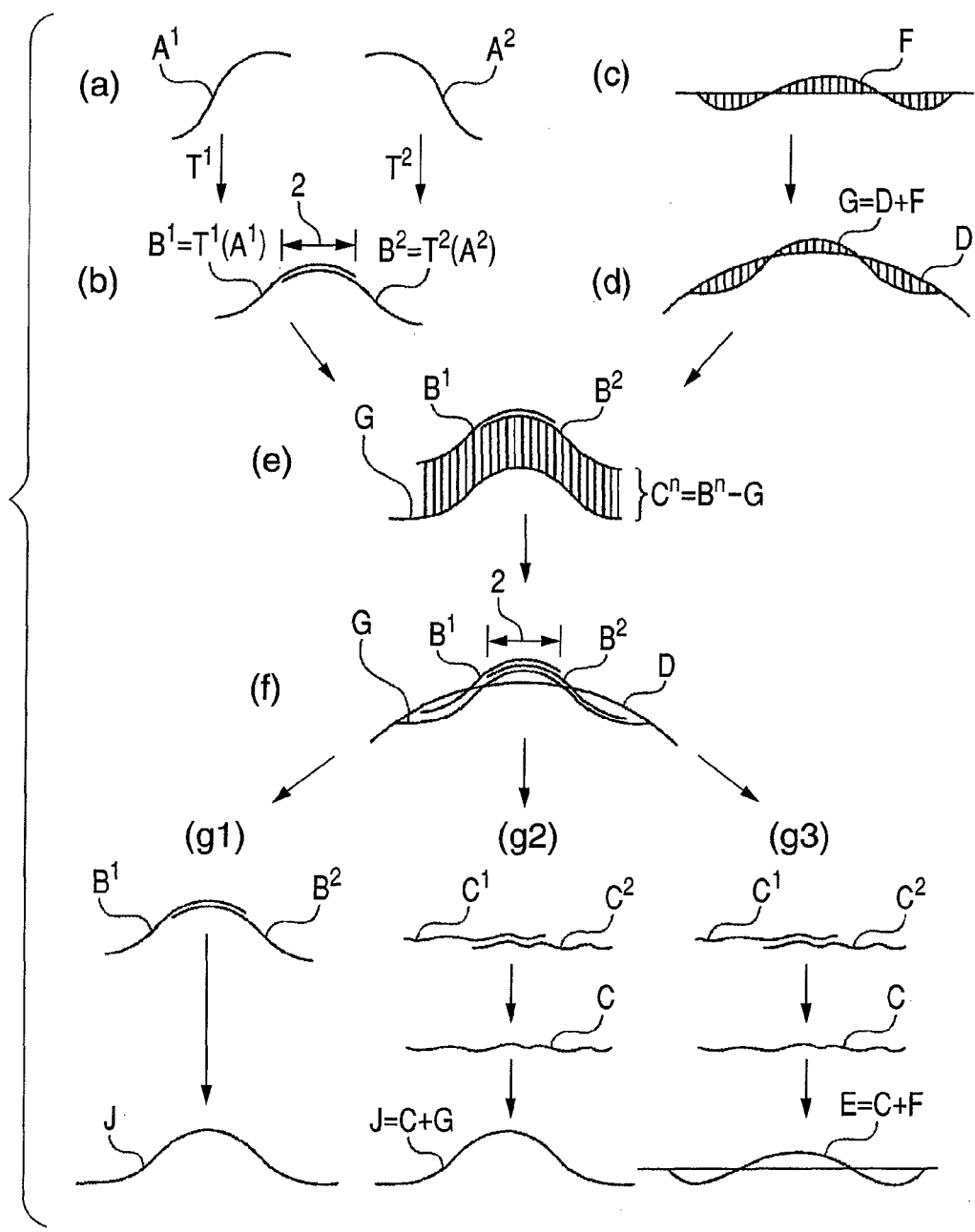
FIG. 1 is comprised of (a), (b), (c), (d), (e), (f), (g1), (g2) and (g3), showing a flowchart illustrating a first embodiment and a second embodiment of the present invention.

Now, the shape measurement method in the first aspect of the present invention will be described in detail on a step by step basis by referring to (a) to (g3) of FIG. 1. An instance of connecting two sets of cross section data will be described below for the purpose of simplicity. In this embodiment, first and second parameters are employed. The first parameter will be referred to as coordinate transformation parameter because it relates to coordinate transformation. The second parameter will be referred to as shape parameter because it relates to an approximate error shape.

Step (a): Collecting partial measurement data respectively from a plurality of partial regions of a workpiece Step (a) will be described by referring to part (a) of FIG. 1. In (a) to (g3) of FIG. 1, $A^1$ and $A^2$ represent the partial measurement data collected respectively from two different measurement regions. In the case of a coordinate measuring machine, partial measurement data are three-dimensional position data. At the time of measurement, it is not necessary for the partial measurement data to overlap each other. In the case of an interferometer, the interference fringe produced by the difference from a reference wavefront serves as partial measurement data.

Step (b): Defining coordinate transformation parameters

Step (b) will be described by referring to part (b) of FIG. 1. It can be assumed that the plural sets of partial measurement data obtained in step (a) do not overlap each other and include data for positional and attitudinal displacements of the workpiece. It should be noted here that the error due to the measuring machine per se is not taken into consideration. Displacements can arise when the workpiece is set in position in the coordinate measuring machine and they are referred to as setting errors. Coordinate transformations $T^1$ and $T^2$ are employed to correct the setting errors and appropriately connect the partial measurement data. Coordinate transformations generally have six degrees of freedom (translations of X, Y and Z and rotations around X, Y and Z axes). The outcome of the coordinate transformations is expressed by B" as illustrated in (a) to (g3) of FIG. 1 and the shape obtained by coordinate transformations of partial measurement data A" is expressed as B"=T" (A").

Now, an exemplary transformation will be specifically described along with the nature of the transformation. The coordinate transformation parameters have six degrees of freedom. They are translations in the X, Y and Z directions and rotations around X, Y and Z axes and the parameters are referred to as $\alpha_1$ through $\alpha_6$. Then, the simultaneous coordinate transformation matrix of 4×4 can be expressed as follows. The position of measurement of the workpiece is selected as initial values for the parameters. For example, if the workpiece is shifted in the X direction by 100 mm for measurement, $\alpha_1$ is made equal to 100 mm. Since a convergence computation is conducted in step (f) as will be described hereinafter, it is not necessary to rigorously define the initial value.

$$[T] = Trans(\alpha_1, \alpha_2, \alpha_3) Rotx(\alpha_4) Roty(\alpha_5) Rotz(\alpha_6) \quad \text{(formula 1)}$$

$$= \begin{bmatrix} \cos\alpha_5\cos\alpha_6 & -\cos\alpha_5\sin\alpha_6 & \sin\alpha_5 & \alpha_1 \\ \cos\alpha_4\sin\alpha_6 + \sin\alpha_4\sin\alpha_5\cos\alpha_6 & \cos\alpha_4\cos\alpha_6 - \sin\alpha_4\sin\alpha_5\sin\alpha_6 & -\sin\alpha_4\cos\alpha_5 & \alpha_2 \\ \sin\alpha_4\sin\alpha_6 - \cos\alpha_4\sin\alpha_5\cos\alpha_6 & \sin\alpha_4\cos\alpha_6 + \cos\alpha_4\sin\alpha_5\sin\alpha_6 & \cos\alpha_4\cos\alpha_5 & \alpha_3 \\ 0 & 0 & 0 & 1 \end{bmatrix}$$

In the above formula, "Trans" represents translation in the X, Y and Z directions and "Rotx" represents rotation around the X axis, while "Roty" represents rotation around the Y axis and "Rotz" represents rotation around the Z axis. The above-described step of subjecting partial measurement data to coordinate transformation means that the above matrix is multiplied by the position vector of each measurement point.

Partial measurement data are a set of measurement points, which are discriminated from each other by the suffixed numerals. Thus, the formula shown below is the formula of coordinate transformation of the m-th measurement point $A^n_m$ to $B^n_m$.

$$B^n_m = T^n A^n_m \quad \text{(formula 2)}$$

As clearly seen from the above formulas, coordinate transformation is a non-linear transformation including "sin" functions and "cos" functions for parameters $\alpha_1$ through $\alpha_6$. As described above, it is difficult to simply optimize the coordinate transformation parameters $\alpha_1$ through $\alpha_6$. This is because the measurement by a coordinate measuring machine involves a large mismatch if compared with the interferometry of the conventional art so that a coordinate measuring machine necessitates a large scale of coordinate transformation, or large coordinate transformation parameter values.

Therefore, when combining plural sets of partial measurement data of a coordinate measuring machine, the coordinate transformation parameters cannot be expressed simply as linear combinations (by using the technique of U.S. Pat. No. 6,956,657). U.S. Pat. No. 6,956,657 provides a technique that can be used only when the assumption of linearity holds true and hence the coordinate transformation parameters $\alpha_1$ through $\alpha_6$ are small numerals.

Figure 2:
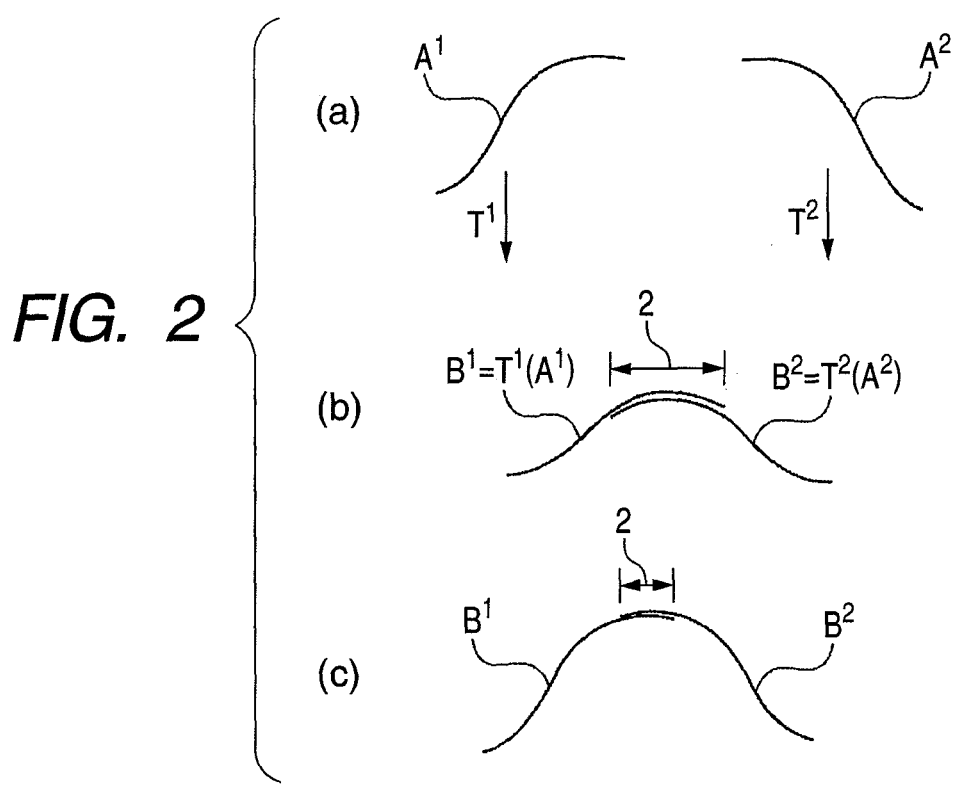
FIG. 2 is comprised of (a), (b) and (c), showing a first illustration of the problems of the conventional art.
Figure 3:
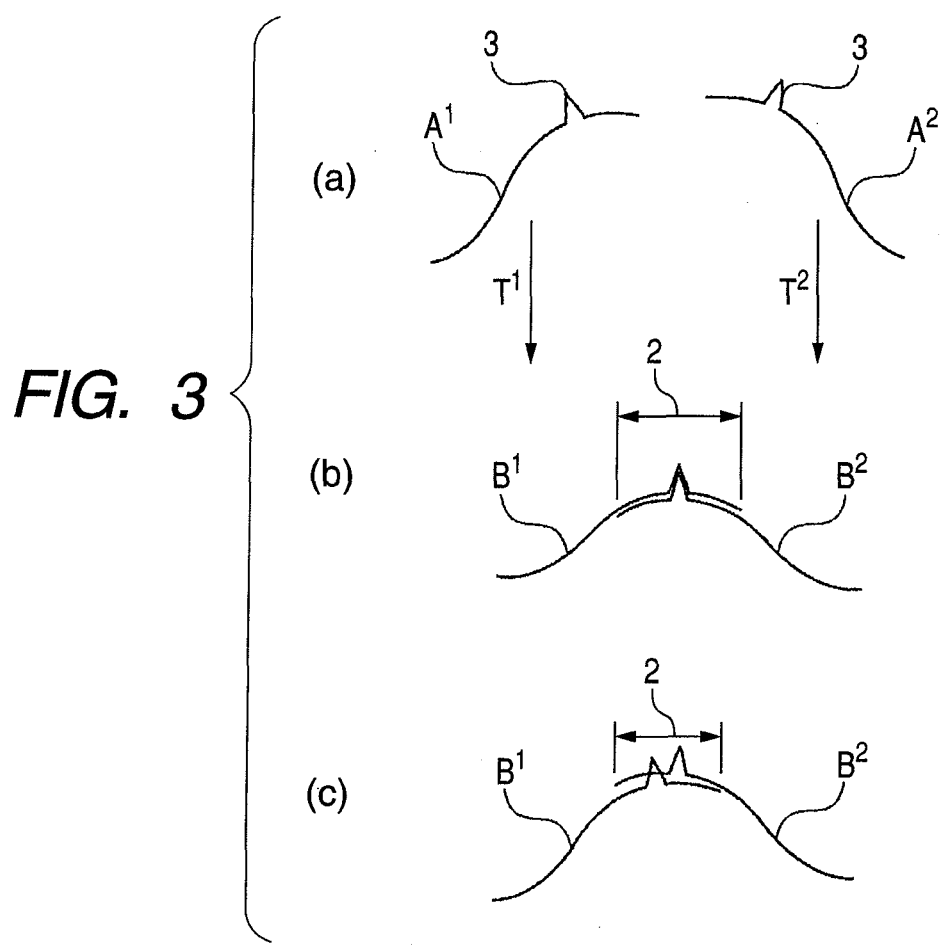
FIG. 3 is comprised of (a), (b) and (c), showing a second illustration of the problems of the conventional art.
Figure 4:
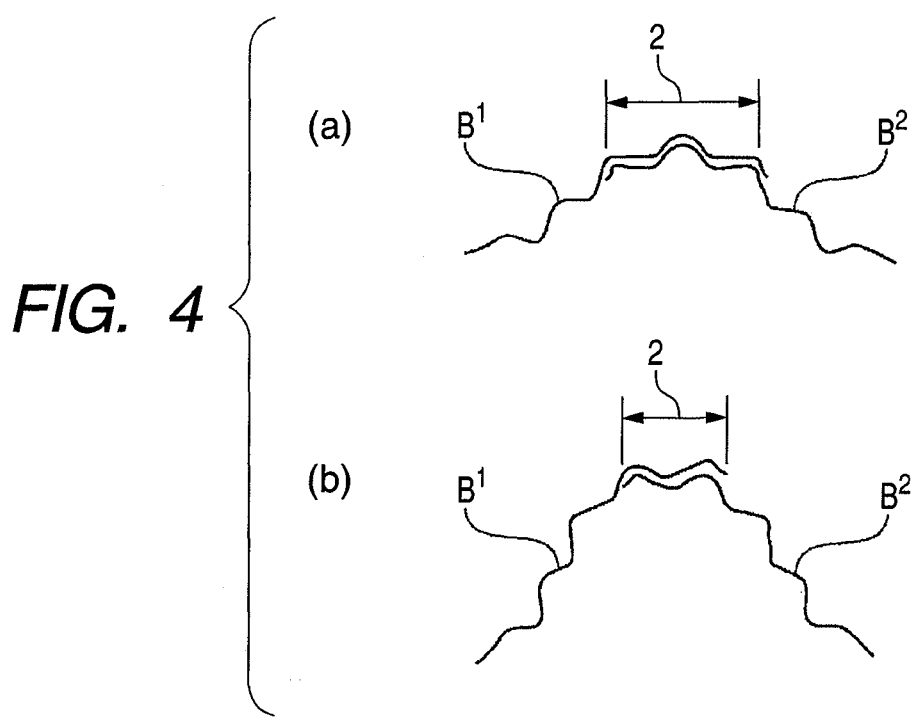
FIG. 4 is comprised of (a) and (b), showing a third illustration of the problems of the conventional art.

Thus, according to the present invention, coordinate transformation as expressed by the above formulas, or non-liner transformation, is required. Shape parameters to be used for optimizing the coordinate transformation parameters $\alpha_1$ through $\alpha_6$ will be described in step (c) below. In (a) to (g3) of FIG. 1, numeral 2 denotes the overlap region. How this region is determined will be described in step (f) below. Note that $B^1$ and $B^2$ are vertically displaced from each other in (a) to (c) of FIG. 2 for the purpose of easy understanding of the following description.

Step (c): Defining an approximate error shape common to all the plural sets of partial measurement data by using shape parameters.

Now, step (c) will be described by referring to part (c) of FIG. 1. This is a step of defining shape parameter β and determining the approximate error shape. The approximate error shape is determined for all the measurement regions and expressed as being common to all the plurality of partial measurement data.

For example, there is a simple method of expressing an approximate error shape by a polynomial. Then, the shape parameters β are a set of coefficients of the polynomial and determining the approximate error shape means computationally determining the polynomial. The approximate error shape is represented by F as illustrated in (a) to (g3) of FIG. 1. The approximate error shape determined in this step is provisional and will be optimized with the above-described coordinate transformation parameters at the time of optimization, which will be described hereinafter.

Step (d): Defining a reference shape including the approximate error shape.

Now, step (d) will be described by referring to part (d) of FIG. 1. The approximate error shape F computed in step (c) and the design shape D of the workpiece are added to each other to obtain a reference shape G that is common to all the sets of partial measurement data:

$$G = D + F \quad \text{(formula 3)}$$

However, there may actually be cases where the design shape of the workpiece is unknown. Then, the approximate error shape is employed as reference shape. It is a special instance where D in the above formula is equal to nil. In short, either the approximate error shape is employed as reference shape, or the approximate error shape and the design shape of the workpiece are added to each other to obtain a reference shape.

Step (e) Computing the difference of the plural sets of partial measurement data and the reference shape G to obtain a differential shape and defining an evaluation value from the differential shape.

Now, step (e) will be described by referring to part (e) of FIG. 1. The difference $C''$ between the outcome $B''$ of partial measurements after coordinate transformation and the reference shape G obtained in step (d) is computed. $C''$ will be referred to as differential shape.

$$C'' = B'' - G \quad \text{(formula 4)}$$

The evaluation value Q is computed from the differential shape. The most simple evaluation value is the square sum.

$$Q = \sum_n \sum_m (C_m^n)^2 \quad \text{(formula 5)}$$
$$= \sum_n \sum_m (B_m^n - G_m)^2$$
$$= \sum_n \sum_m (T^n A_m^n - D_m - F_m)^2$$

In the above formula, suffix n at the right shoulder represents a measurement number that corresponds to one of the plural sets of measurement data as described above and suffix m represents an element of the data, or the number of measurement point. The first set of parameters, or coordinate transformation parameters α, are included in T. The shape parameters β are included in the approximate error shape F. The evaluation value Q varies as the parameters α and β are made to vary.

Step (f): Determining both the coordinate transformation parameters and the shape parameters so as to minimize the evaluation value Now, step (f) will be described below by referring to part (f) of FIG. 1. The parameters α and β are regulated in Step f so as to minimize the evaluation value Q obtained in step (e). Since the evaluation value to be minimized is computed from the differential shape $C'' = B'' - G$, or formula 4, the differential shape is made equal to nil and hence the partial measurement data $B''$ that are subjected to coordinate transformation fit to the common reference shape G as a result of optimization.

The coordinate transformation parameters α for optimization are used for correcting the setting error of the workpiece. As will be described hereinafter, the setting error and hence positional displacements of the measurement data can be rigorously corrected. The shape parameter β of the parameters for optimization is provided to support the correction.

As the shape parameter β is made to vary, the approximate error shape F is made to vary to thereby make the reference shape G closer to the shape $B''$ of the measurement data. The overall shape of the workpiece can be computationally determined by connecting the partial measurement data, using the coordinate transformation parameters and the shape parameter determined as a result of the optimization. This method provides the following advantages and hence can solve the problems of the conventional art.

According to the present invention, the entire measurement region is used to optimize the coordinate transformation parameters α by employing the approximate error shape F. There is only a single site where the measurement data fit as a result of the computations. If the site is displaced even slightly, the differential shape $C'' = B'' - G$ becomes abruptly large and the evaluation value is aggravated also abruptly. Since the conventional art performs computations only for the data of a narrow overlap region, it cannot determine the right site when connecting partial measurement data that shows a large mismatch by a coordinate measuring machine.

Thus, according to the present invention, the positional displacements of the partial measurement data can be accurately determined. As a result, relative positions of the partial measurement data can be accurately determined.

According to the present invention, measurements can be conducted highly accurately at high speed without using the concept of overlap of partial measurement data, or the concept of overlap region. Thus, partial measurement data can be made to fit without employing the concept of overlap region, the present invention can dissolve:

(1) the difficulty of highly accurately determining overlap regions;
(2) the problem that partial shapes can fit together at a wrong site to increase the measurement error in an overlap region;
(3) the problem that a slight change in an overlap region significantly affects the overall shape to aggravate the accuracy level; and
(4) the problem of taking a long time for accurately searching overlap regions.

According to the present invention, an instance where the evaluation value can be optimally reduced is implicitly assumed. It is sufficient to put a negative sign to the evaluation value when it should be optimally increased. The optimization of the conventional art is to minimize the difference of measurement data in overlap regions, or the mismatch. The present invention neither employs any concept of overlap and nor considers any mismatch as described above. Thus, according to the present invention, plural sets of partial measurement data $B''$ are made to fit a common reference shape G as described above in step (f).

Thus, as a result, plural sets of partial measurement data agree with each other by way of G. Hence, the mismatch, if any, is minimized by the present invention.

Second Embodiment

Now, the second aspect of the present invention will be described in detail also by referring to (a) to (g3) of FIG. 1. When connecting plural sets of partial measurement data by means of the coordinate transformation parameters and the shape parameter that are optimized, one of the steps (g1), (g2) and (g3) described below can be used.

Step (g1): Making plural sets of partial measurement data that are subjected to coordinate transformations overlap each other and transforming them into an overall shape.

Step (g1) will be described by referring to part (g1) of FIG. 1. The alignment of the plural sets of partial measurement data should be completed by step (f). Thus, as a result, the difference of measurement data, or the mismatch, in the overlap region should be small as described above. As illustrated, the partial measurement data B that are subjected to coordinate transformation are made to overlap each other and transformed into an overall shape J.

Step (g2): Making a plurality of differential shapes overlap each other, transforming them into an overall differential shape and adding the reference shape thereto to transform them into an overall shape.

Step (g2) will be described by referring to part (g2) of FIG. 1. The alignment of the plural sets of partial measurement data should be completed and the mismatch, if any, should be small by step (f). The differential shapes are made to overlap each other to obtain the overall differential shape C and the overall differential shape C is added to the reference shape G so as to transform then into an overall shape J. In other words, $$J = C + G \quad \text{(formula 6)}$$
$$= C + D + F$$

is made to hold true.

Step (g3): Making a plurality of differential shapes overlap each other, transforming them into the overall shape and adding the approximate error shape thereto to transform them into an overall error shape.

Step (g3) will be described by referring to part (g3) of FIG. 1. The alignment of the plural sets of partial measurement data should be completed and the mismatch, if any, should be small by Step (f). The differential shapes are made to overlap each other to obtain an overall differential shape C and the approximate error shape F is added thereto to determine the overall error shape E. In other words, $$E = C + F \quad \text{(formula 7)}$$

is made to hold true.

It may be clear by comparing step (g2) and step (g3) that the shape is equal to the difference of the overall shape J and the design shape D. Normally, what is important for evaluation of an optical element is the deviation from the design shape, or the error shape E. As described above, the overall shape can be formed by overlapping, using any of various simple methods.

Third Embodiment

The third aspect of the present invention relates to systematic errors. This will be described in detail by referring to (a), (b), (c), (d), (e), (f), (g1), (g2), (g3), (h) and (j) of FIG. 5. A systematic error is an error that a measuring machine intrinsically has. Measurement errors typically include errors that vary from measurement to measurement and those that do not vary and systematic errors belong to the latter. Systematic errors should be measured and corrected by means of a certain method. According to the present invention, a systematic error can be corrected by making it included in the parameters for optimization. In (a), (b), (c), (d), (e), (f), (g1), (g2), (g3), (h) and (j) of FIG. 5, step (a) is a step for obtaining measurement data. Note that $A^1$ and $A^2$ are measurement data that include a systematic error.

Step (h): Defining a systematic error parameter.

Figure 5:
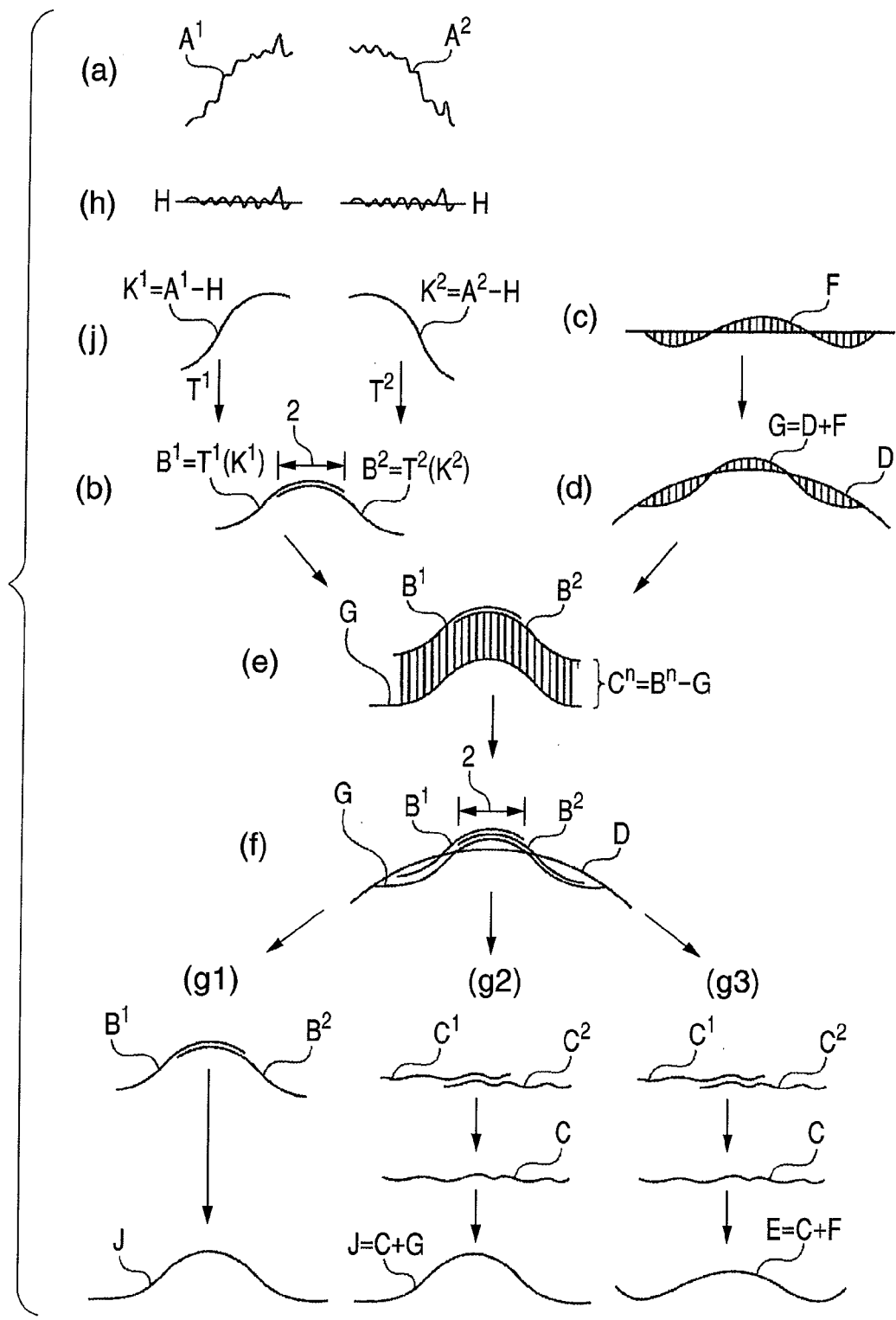
FIG. 5 is comprised of (a), (b), (c), (d), (e), (f), (g1), (g2), (g3), (h) and (j), showing a flowchart of a third embodiment of the present invention.

Now, step (h) will be described by referring to part (h) of FIG. 5. Symbol γ represents systematic error parameters and systematic error H is computed by using the systematic error parameters γ. For example, there is a simple method of expressing a systematic error by a polynomial. Then, the systematic error parameters γ are coefficients of the polynomial and determining the systematic error H means computationally determining the polynomial. In this way, the systematic error indicated by H of part (h) of FIG. 5 is defined. At this time, the systematic error parameters γ are determined in step (f) along with the coordinate transformation parameters α and the shape parameters β, which are described above.

Step (j): Subtracting the systematic error from the partial measurement data before defining the coordinate transformation parameters.

Now, step (j) will be described below by referring to part (j) of FIG. 5. The systematic error H is subtracted from each set of partial measurement data $A^n$ to obtain new measurement data. In other words, $$K^n = A^n - H \quad \text{(formula 8)}$$

is computed. Since all the sets of partial measurement data $A^n$ are obtained by the same measuring machine, the systematic error is common to all the measurement data.

The steps and the effects that follow are the same as those of the first aspect of the present invention and hence will not be described any further, the only difference being that the systematic error parameters γ is added in step (f) of optimizing the parameters. In other words, the systematic error parameters γ are optimized with the coordinate transformation parameters α and the shape parameters β.

Thus, the above-described method can correct the systematic error if it exists to thereby further improve the measurement accuracy. Additionally, according to the present invention, parameters can be expressed as coefficients of a polynomial to reduce the load of computations so as to enable high-speed data processing.

As described above by referring to (a) to (g3) of FIG. 1 and (a), (b), (c), (d), (e), (f), (g1), (g2), (g3), (h) and (j) of FIG. 5, there are three types of parameters (α, β, γ) that are optimized in step (f).

(1) Coordinate transformation parameters (α)
(2) Shape parameters (β)
(3) Systematic error parameters (γ)

Of the above three types of parameters, type (1) includes non-linear parameters that include trigonometric functions as shown in formula 1. According to the present invention, the remaining parameters are expressed by a polynomial as shown below. More specifically, the approximate error shape F is expressed in a manner as shown below, using the parameters β and the horizontal coordinate values of x and y.

$$F(x, y) = \sum_i \beta_i x^{ni} y^{mi} \qquad \text{(formula 9)}$$

In the above formula, βi is the i-th shape parameter and ni is the multiplier of x, while mi is the multiplier of y. The initial values of all the parameters may be made equal to nil because a convergence computation is conducted in step (f). The approximate error shape F is a shape that is fixed to the workpiece. Therefore, the above XY coordinates in the above formula are those fixed to the workpiece.

The systematic error parameters γ and the systematic error H can be defined in a similar manner.

$$H(x, y) = \sum_i \gamma_r x^{ni} y^{mi} \qquad \text{(formula 10)}$$

In the above formula, γi is a systematic error parameter and ni is a multiplier of x, while mi is a multiplier of y. The systematic error shows a shape fixed to the measuring machine. Therefore, the XY coordinates of the above formula are those fixed to the measuring machine. The initial values of all the parameters may be made equal to nil because a convergence computation is conducted in step (f). Generally, when optimizing parameters, they do not converge unless the parameters are independent and hence can be discriminated from each other. This requirement can be satisfied according to the present invention as will be described below.

Firstly, the coordinate transformation parameters α of type (1) are non-linear parameters that include trigonometric functions as shown in formula 1 so that they can be discriminated from the other parameters that are linear parameters. While both of the remaining two types of parameters are polynomials, parameters of type (2) represent a shape fixed to the workpiece and parameters of type (3) represent a shape fixed to the measuring machine so that their positions are shifted at each measurement and they can be discriminated from each other.

This will be described by referring to (a), (b), (c), (d), (e), (f), (g1), (g2), (g3), (h) and (j) of FIG. 5. The approximate error shape of (2) is F of part (c) of FIG. 5. It is a shape fixed to the workpiece. On the other hand, the systematic error shape of (3) is H of part (h) of FIG. 5. The plural sets of measurement data $A^1$ and $A^2$ are obtained by shifting the position of the workpiece and that of the measuring machine. Therefore, F that is a shape fixed to the workpiece and H that is a shape fixed to the measuring machine can be discriminated from each other. Additionally, the term or terms in the polynomials that cannot be discriminated by shifting the positions may be eliminated when selecting the parameters. For instance, such a term may be a constant term. This embodiment employs simple polynomials, therefore, the load of computations is reduced and data can be processed at high speed.

When optimizing the parameters, they do not converge unless the parameters are independent and hence can be discriminated from each other. Attention should be paid because the coordinate transformation parameters α may include those that operate as non-independent variables depending on the shape of the workpiece. Such instances will be described below.

When the workpiece is a plane, the number of independent parameters is three. For example, in the case of a plane defined by Z=0, the independent parameters may be Z in the vertical direction relative to the plane Z=0 and rotations θx and θy respectively around the X axis and the Y axis. The remaining X and Y in horizontal directions and rotation θz around the Z axis are not included in the coordination transformation parameters because they cannot be discriminated.

When the workpiece is a sphere, the number of independent parameters is also three. For example, they may be the coordinates X, Y and Z of the center of the sphere. When the workpiece is an axis-symmetric non-spherical lens, the number of independent parameters is five, excepting rotation around the axis. The coordinate transform parameters can be computed stably in the case of planes, spheres and axis-symmetric non-spheres.

The instance of using the square sum of a differential shape as evaluation value Q is described in formula 5 above already. The evaluation value Q is defined by the formula shown when the maximum and the minimum of a differential shape is used as evaluation value.

$$Q = \max_{n,m}(C_m^n) - \min_{n,m}(C_m^n) \qquad \text{(formula 11)}$$

When such an evaluation value Q is employed, the load of computations for determining the evaluation value Q is reduced so as to enable to process data at high speed because a simple formula is used.

Fourth Embodiment

The approximate error shape F is a value representing the shape error that arises at the time of manufacturing the workpiece. If the collected partial measurement data show large differences that are beyond being expressible by a single common approximate error shape F, the differential shape C does not become small relative to the actual measurement data. In other words, a poor result of convergence is obtained in step (f) so that there may be large computation errors. This aspect of the present invention dissolves such a problem. Only the differences between this aspect and the first aspect of the present invention will mainly be described below by referring to (a), (b), (c), (d), (e), (f), (g1), (g2), (g3), (m) and (n) of FIG. 6.

Figure 6:
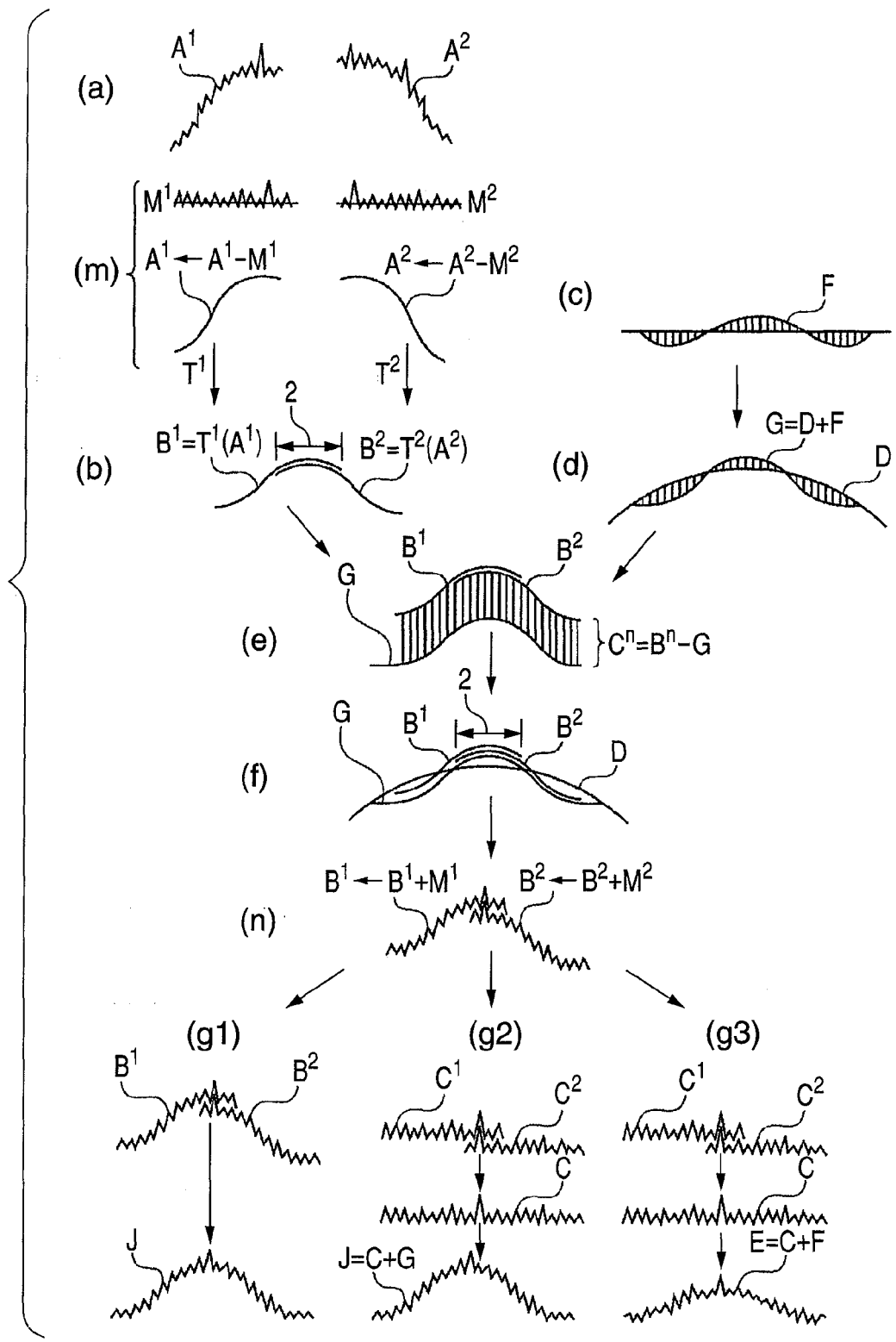
FIG. 6 is comprised of (a), (b), (c), (d), (e), (f), (g1), (g2), (g3), (m) and (n), showing a flowchart of a fourth embodiment of the present invention.

Step (m) that comes between step (a) and step (b) will be described by referring to part (m) of FIG. 6. Assume that the measurement data obtained in step (a) includes a high spatial frequency component. The workpiece may originally bear such a component or it may get in as noise at the time of measurement. It is difficult to express such a high frequency component by the approximate error shape F defined in step (c) because a high frequency means that the number of necessary parameters is large. When the number of parameters is large, the computation time spent for optimization abruptly rises. For this reason, step (m) is provided to isolate the high frequency component.

In step (m), a high pass filter is applied to each shape data $A''$ to extract the high frequency component $M''$. Then, the high frequency component $M''$ is subtracted from the set of shape data $A''$ and the difference is newly defined as $A''$. Since a specific high frequency component is eliminated from the computationally determined $A''$, the problem described above that the differences are beyond being expressible by a single common approximate error shape F is dissolved.

The steps down to step (f) for optimizing the parameters are the same as those of the first aspect of the present invention. Now, step (n) that immediately comes after step (f) will be described below by referring part (n) of FIG. 6. After the optimization step, the high frequency component that is extracted in step (m) is returned to the set of shape data, which is then newly defined as B''. The procedures that follow are the same as those of the first aspect of the present invention. Thus, the synthesis process can be executed highly accurately by way of computations if the measurement data include a high spatial frequency component. A constraint parameter that relates to the equality constraints may additionally be introduced.

That the differences among the measurement data and hence the mismatch can be brought close to nil is described above. According to the present invention, the mismatch can be made equal to nil more accurately by explicitly adding these conditions for making the mismatch equal to nil.

As described above, it is known that optimization problems having an equality constraint can be solved by means of the method of Lagrange multipliers. According to the present invention, an equation that makes the mismatch equal to nil is adopted as equality constraint. The specific procedures will be described below by referring to (a), (b), (c), (d), (e, p), (f), (g1), (g2) and (g3) of FIG. 7.

Figure 7:
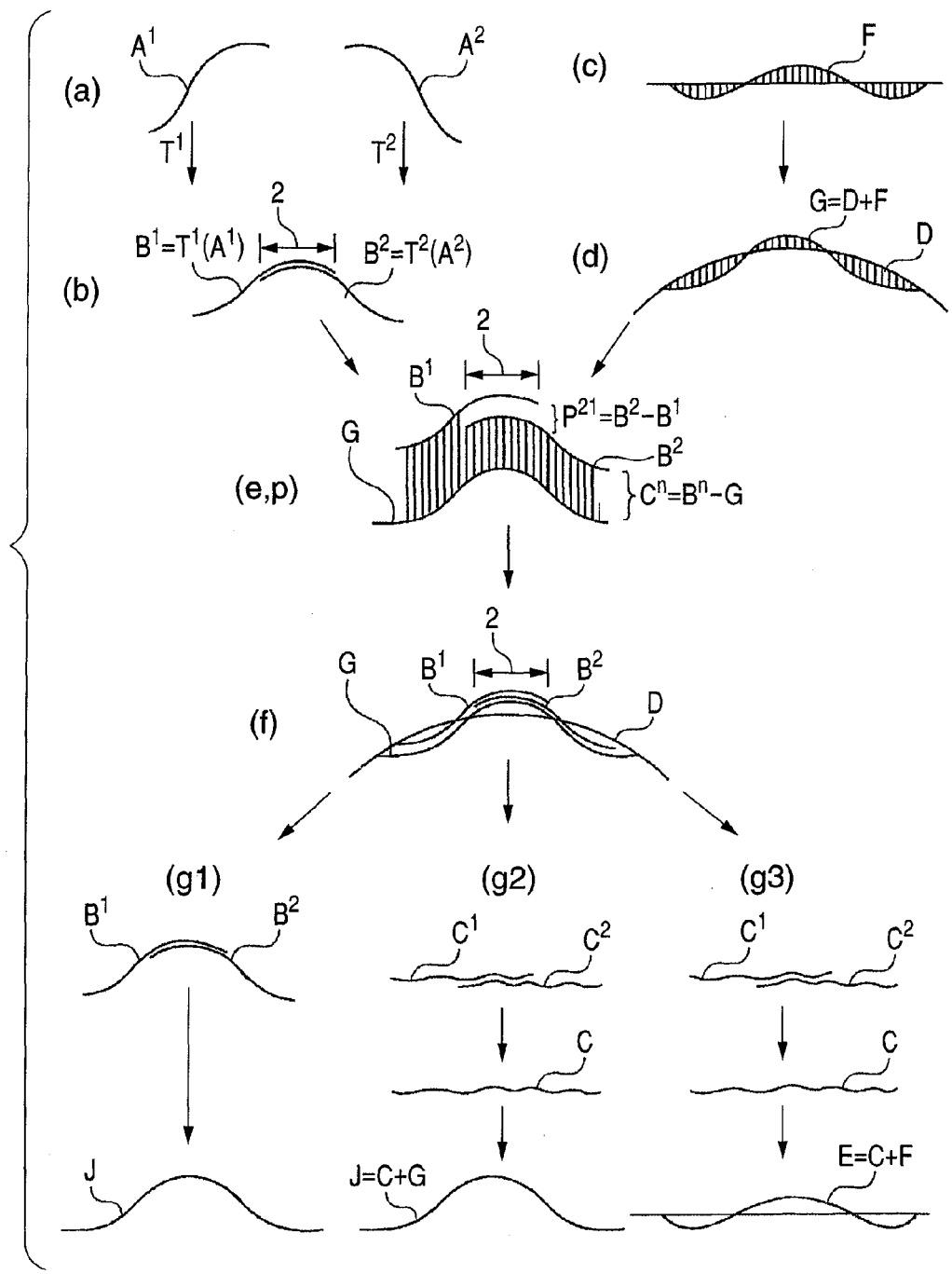
FIG. 7 is comprised of (a), (b), (c), (d), (e,p), (f), (g1), (g2) and (g3), showing a flowchart illustrating a computation method of the present invention.

The difference between this aspect and the first aspect of the present invention will be described below by referring to part (e, p) in FIG. 7. The difference P of the sets of measurement data B'' that are subjected to coordinate transformation in overlap region 2 is computationally determined. The difference between $B''^{n1}$ and $B''^{n2}$ is expressed as $p''^{n1 \cdot n2}$. Thus, the difference between $B^2$ and $B^1$ is expressed as $p^{21}$.

As pointed out earlier, the difference between the sets of measurement data is referred to as mismatch. In the drawing, the mismatch is exaggerated for easy understanding of the explanation. $p''^{n1 \cdot n2}=0$ means that the mismatch is equal to nil and hence $B''^{n1}$ and $B''^{n2}$ agree with each other in the overlap region. This condition is adopted as equality constraint for the optimization step of step (f).

Constraint parameters $\lambda^{nn}$ are provided and the product of multiplication of the parameters and the mismatch is added to the evaluation value Q. This will be expressed by the formula shown below, using the formula 5 for determining the evaluation value.

$$Q = \sum_n \sum_m (C_m^n)^2 + \sum_{n1} \sum_{n2} \lambda^{n1,n2} p^{n1,n2} \qquad \text{(formula 12)}$$

In step (f), the evaluation value Q is optimized by adjusting the parameters. The constraint parameters $\lambda^{nn}$ are added to the parameters that are adjusted in step (f). As described above, $p''^{n1 \cdot n2}$ can be made equal to nil and hence the mismatch can be accurately reduced to nil by applying the method of Lagrange multipliers.

EXAMPLE 1

Now, Example 1 of the present invention will be described by referring to FIGS. 1, 8 and 9.

Figure 8:
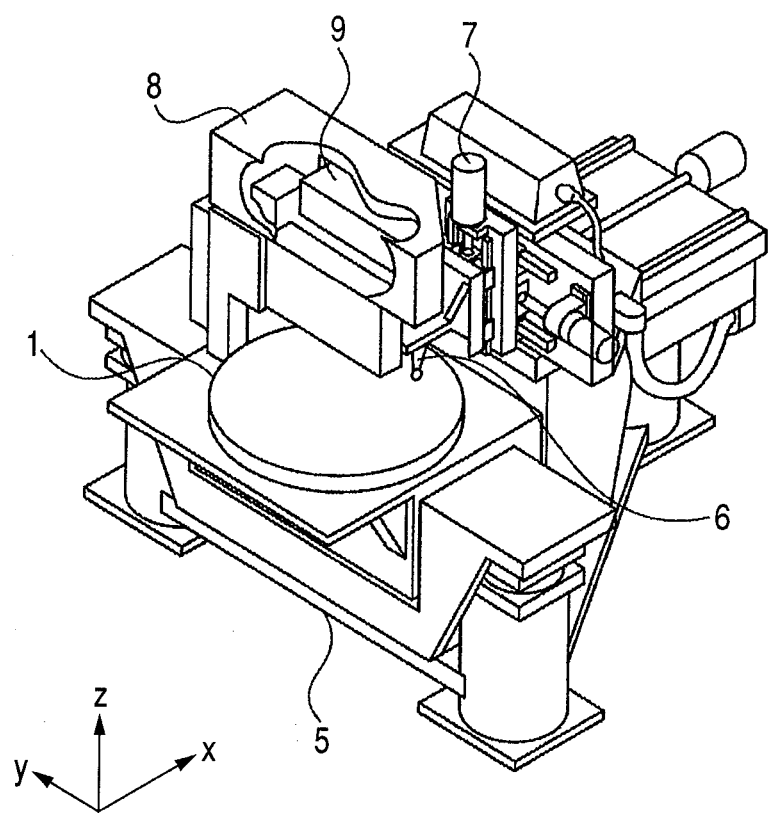
FIG. 8 is a schematic illustration of an exemplar coordinate measuring machine of Example 1 of the present invention.

FIG. 8 is a schematic illustration of an exemplary coordinate measuring machine. In FIG. 8, a large workpiece 1 is mounted in the machine main body 5. A contact type probe 6 is fitted to XYZ slide 7 that can be moved in three axial directions of XYZ and pressed against the surface of the workpiece 1 so as to be driven to scan the surface of the workpiece. The machine is designed to observe the move of the probe, using reference mirrors rigidly secured to metrology frame 8 as reference of measurement. FIG. 8 illustrates a reference mirror 9 for the Z direction.

When the workpiece is large, the entire surface thereof cannot be covered by a single measurement session so that partial measurements need to be repeatedly conducted to obtain plural sets of partial measurement data, which are required to be subsequently joined together.

Figure 9:
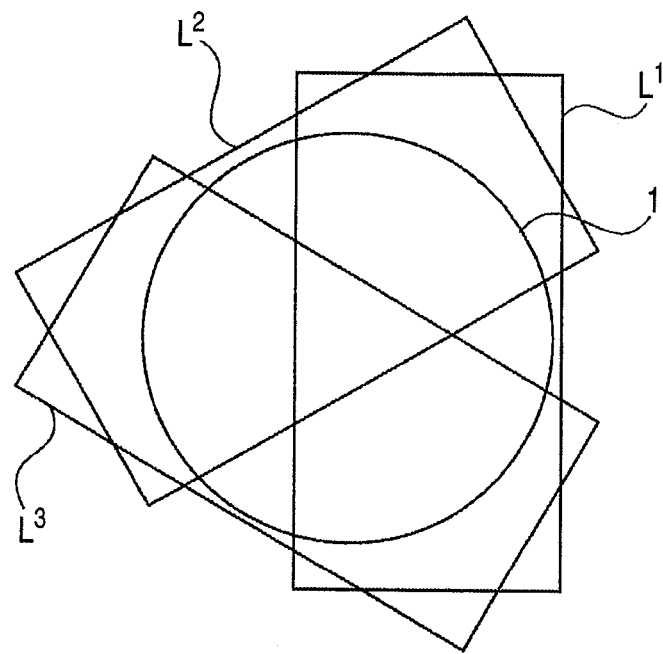
FIG. 9 is a second illustration of Example 1 of the present invention.

FIG. 9 schematically illustrates a circular workpiece 1, which may typically be a lens that needs to be measured in three measurement sessions. The workpiece is rotated by 120 degrees at a time and set in position on the coordinate measuring machine for a partial measurement session. The partial measurement region of a single measurement session is indicated by L''. The numeral at the right shoulder represents a measurement number. As shown, the partial measurement regions L'' are arranged such that the entire surface of the workpiece is covered by three measurement sessions. Three partial measurement data $A^1$, $A^2$ and $A^3$ are obtained as a result of the three partial measurement sessions.

The position of measurement of the workpiece is selected for the initial value of coordinate transformation parameter. For example, if the workpiece is shifted in the X direction by 100 mm for measurement, $\alpha_1$ is made equal to 100 mm. It is not necessary to rigorously define the initial value. The operation of processing the data and its effects are described in detail above so that they will not be described here any further.

A measuring machine having only a small measurement region can be used to obtain the measurement data of the entire surface of a large workpiece by joining the obtained partial measurement data together.

While the number of partial measurement regions of the above-described example is three, any number not less than two may be selected for the purpose of the present invention.

EXAMPLE 2

Figure 10:
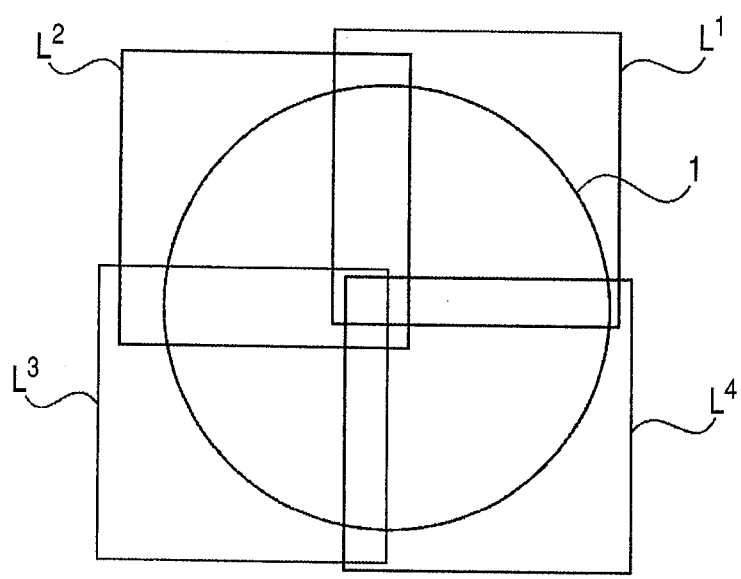
FIG. 10 is a schematic illustration of Example 2 of the present invention.
Figure 13:
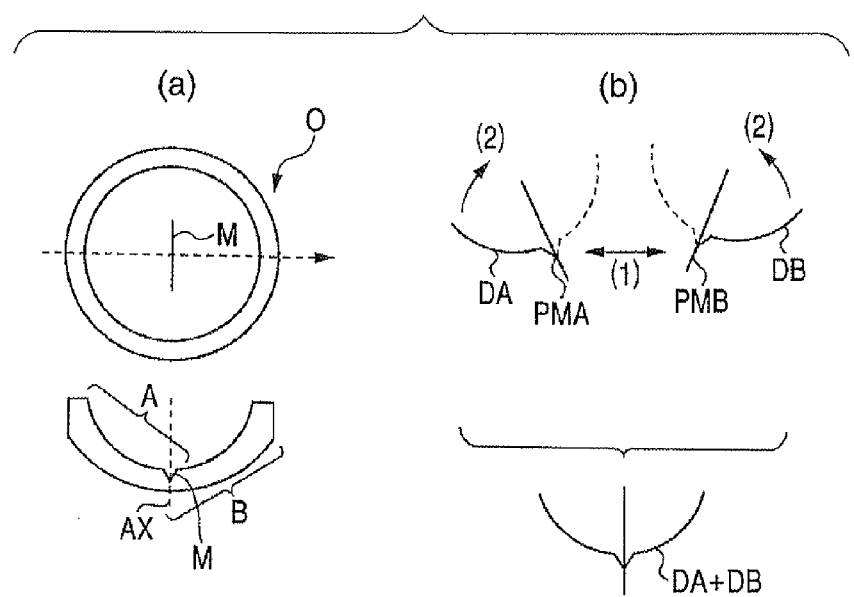
FIG. 13 is comprised of (a) and (b), showing a schematic illustration of the second conventional art.
Figure 14:
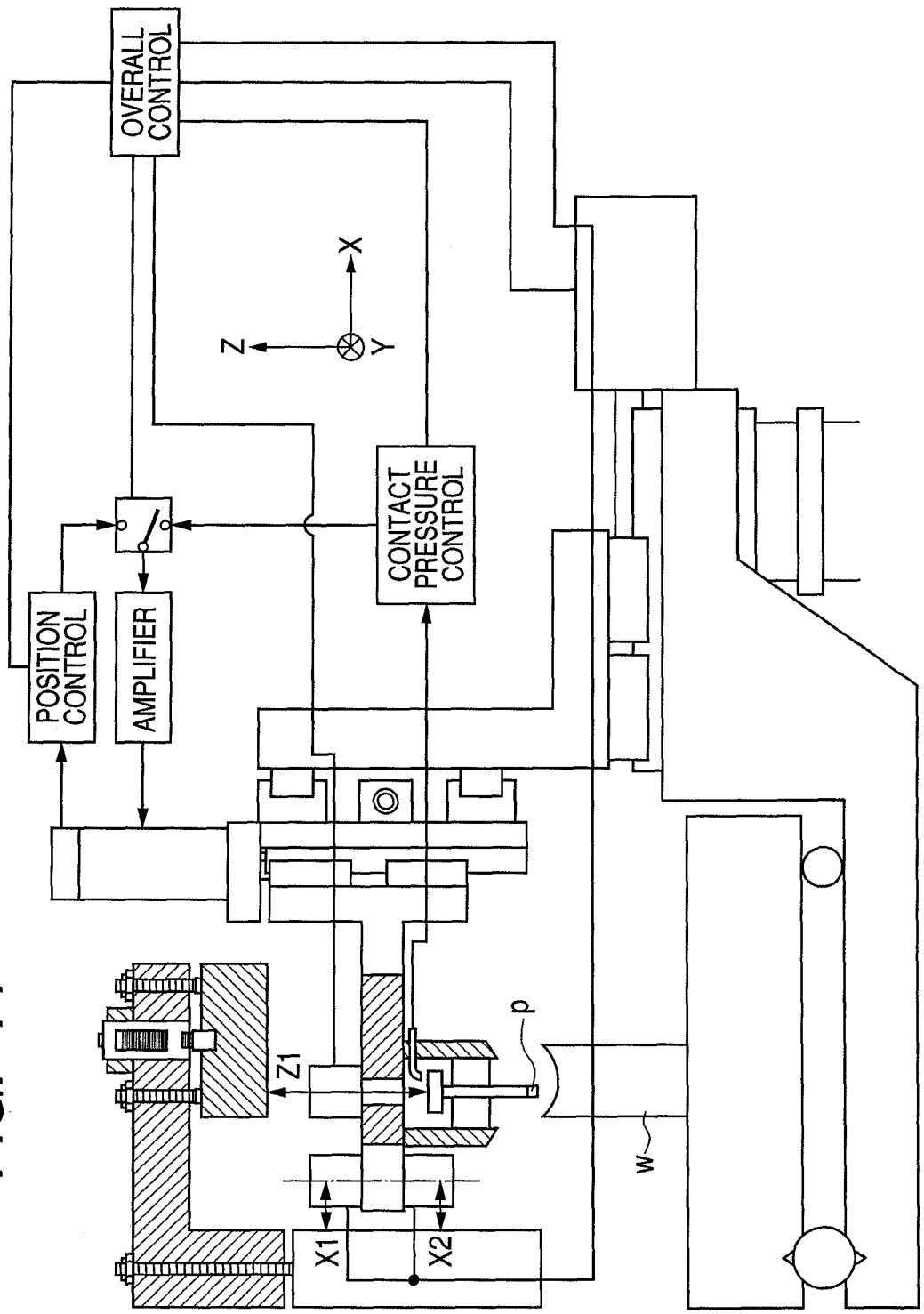
FIG. 14 is a schematic illustration of a known coordinate measuring machine.

FIG. 10 is a schematic illustration of Example 2 of the present invention. While the workpiece is rotated to change its attitude and the data obtained by a plurality of measurement sessions are employed in the preceding example, the workpiece is set in position and displaced transversally in this example. The operation and the effects of this example are substantially the same as those of the above example and hence will not be described any further.

The present invention is applicable to any number of partial measurement sessions that is not less than two. The obtained plural sets of partial measurement data may be made to overlap each other by rotating a partial measurement region as described above for the preceding example or displacing it transversally.

Furthermore, the present invention is applicable when there is not any overlap region. Then, regions that are devoid of any measurement data may exist as so many patches but the overall shape can be summarily grasped if the entire surface is smooth.

On the other hand, the entire surface may be an overlap region. If such is the case, the overall measurement region does not expand if the obtained measurement data are synthetically combined. Additionally, the accuracy of measurement can be improved because the plurality of measurement data is averaged for the overlap region.

As described above, partial measurement data can be synthetically combined without using the concept of overlap region for the purpose of the present invention.

EXAMPLE 3

Example 3 of the present invention will be described below by referring to FIGS. 8 and 11A through 11C. The stitching technique is developed to measure a large workpiece by using relatively small measurement regions. However, to the contrary, the present invention can be applied to measure the systematic error of a measuring machine by observing a small workpiece.

A coordinate measuring machine as illustrated in FIG. 8 generally has a reference of accuracy. It is the reference mirror 9 in the case of the machine of FIG. 8 and the shape error of the mirror is a major cause of the systematic error of the machine.

Both the shape of a workpiece and that of the systematic error can be determined by means of the above-described third embodiment of the present invention. Additionally, there is not any constraint for the ratio of their sizes. The workpiece is smaller than the systematic error in this example.

Now, this example will be described more specifically by referring to FIGS. 11A through 11C. FIGS. 11A, 11B and 11C schematically illustrate measurement regions of the measuring machine of FIG. 8. In the drawings, a reference mirror 9 and a workpiece 1 are illustrated.

Firstly, the workpiece 1 is set in position as illustrated in FIG. 11A and partial measurement data $A^1$ is obtained from the measurement region $L^1$. Then, similarly, the workpiece 1 is set in position as illustrated in FIG. 11B and partial measurement data $A^2$ is obtained from the measurement region $L^2$. Finally, the workpiece 1 is set in position as illustrated in FIG. 11C and partial measurement data $A^3$ is obtained from the measurement region $L^3$.

The processing steps that come after the acquisition of the partial measurement data are the same as those described above. Both the systematic error defined in the measurement region $L^n$ and the region 9 that is covered by measurement sessions can be determined. The obtained results show the shape of the workpiece 1 and that of the reference mirror 9.

The systematic error is determined by three measurement sessions in this example. However, the number of measurement sessions does not give rise to any problem so long as it is not less than two.

While a workpiece is displaced by translation in this example, the above description also applies to an instance where a workpiece is displaced by rotation.

Additionally, displacement by translation and displacement by rotation can be combined. For example, a total of twelve measurement data can be obtained when the workpiece 1 is rotated by 90 degrees at the three positions illustrated respectively in FIGS. 11A, 11B and 11C. The systematic error can be determined by computations, using the twelve partial measurement data.

Thus, the systematic error of a measuring machine can be determined by using a small workpiece as described above for this example. As the error is determined, the measurement accuracy can be improved by subtracting the error from the value obtained by way of the measurement sessions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-149366, filed Jun. 6, 2008, which is hereby incorporated by reference in its entirety.

What is claimed is:

1. A shape measurement method of combining plural sets of partial measurement data representing respective shapes of a plurality of partial surface regions of a workpiece to obtain an overall surface shape of the workpiece, using a shape measuring machine comprising a measuring unit and a processing unit, the method comprising:

a step performed by the measuring unit of collecting the plural sets of partial measurement data from the plurality of partial surface regions of the workpiece;

a step performed by the processing unit of isolating a specific frequency component from the partial measurement data;

a step performed by the processing unit of transforming coordinates of the plural sets of partial measurement data to obtain plural sets of coordinate-transformed partial measurement data, using coordinate transformation parameters for each of the plural sets of partial measurement data, after the specific frequency component is isolated;

a step performed by the processing unit of defining an approximated error shape which represents the overall surface shape of the workpiece and which is common to the plural sets of partial measurement data;

a step performed by the processing unit of defining a reference shape including the approximated error shape and a design shape, using shape parameters;

a step performed by the processing unit of computing differential shapes between each of the plural sets of coordinate-transformed partial measurement data and the reference shape and optimizing both the coordinate transformation parameters and the shape parameters so as to make an evaluation value defined from the differential shapes approach a predetermined value;

a step performed by the processing unit of adding back the isolated frequency component to the partial measurement data after both the coordinate transformation parameters and the shape parameters are optimized; and a step performed by the processing unit of connecting the plural sets of coordinate-transformed partial measurement data, using both the optimized coordinate transformation parameters and the optimized shape parameters.

2. The method according to claim 1, wherein
the plural sets of partial measurement data are connected either by making the plural sets of coordinate-transformed partial measurement data overlap each other and then transforming them into the overall shape or by making the differential shapes for the plural sets overlap each other to define an overall differential shape and transforming them into the overall shape by adding the reference shape to the overall differential shape in the step of connecting the partial measurement data.

3. The method according to claim 1, further comprising:
a step performed by the processing unit of defining a systematic error involved in the shape measuring machine per se by using one or more systematic error parameters and subtracting the systematic error from each of the plural sets of partial measurement data before the step of transforming coordinates;
the systematic error parameters being optimized along with the coordinate transformation parameters and the shape parameters in the step of optimizing parameters.

4. A shape measuring machine for combining plural sets of partial measurement data representing respective shapes of a plurality of partial surface regions of a workpiece to obtain an overall surface shape of the workpiece, comprising:
a measuring unit constructed to measure a surface shape of the workpiece by collecting the plural sets of partial measurement data from the plurality of partial surface regions of the workpiece; and
a processing unit constructed to implement the steps of:

isolating a specific frequency component from the partial measurement data;

transforming coordinates of the plural sets of partial measurement data to obtain plural sets of coordinate-transformed partial measurement data, using coordinate transformation parameters for each of the plural sets of partial measurement data, after the specific frequency component is isolated;

defining an approximated error shape which represents the overall surface shape of the workpiece and which is common to the plural sets of partial measurement data;

defining a reference shape including the approximated error shape and a design shape using shape parameters;

computing differential shapes between each of the plural sets of coordinate-transformed partial measurement data and the reference shape and optimizing both the coordinate transformation parameters and the shape parameters so as to make an evaluation value defined from the differential shapes approach a predetermined value;

adding back the isolated frequency component to the partial measurement data after both the coordinate transformation parameters and the shape parameters are optimized; and connecting the plural sets of coordinate-transformed partial measurement data, using both the optimized coordinate transformation parameters and the optimized shape parameters.

\* \* \* \* \*